Nov. 16, 1948.  W. HAMILTON  2,454,251
CARTRIDGE FEEDING MECHANISM FOR AUTOMATIC GUNS
Filed Jan. 11, 1946  9 Sheets-Sheet 6
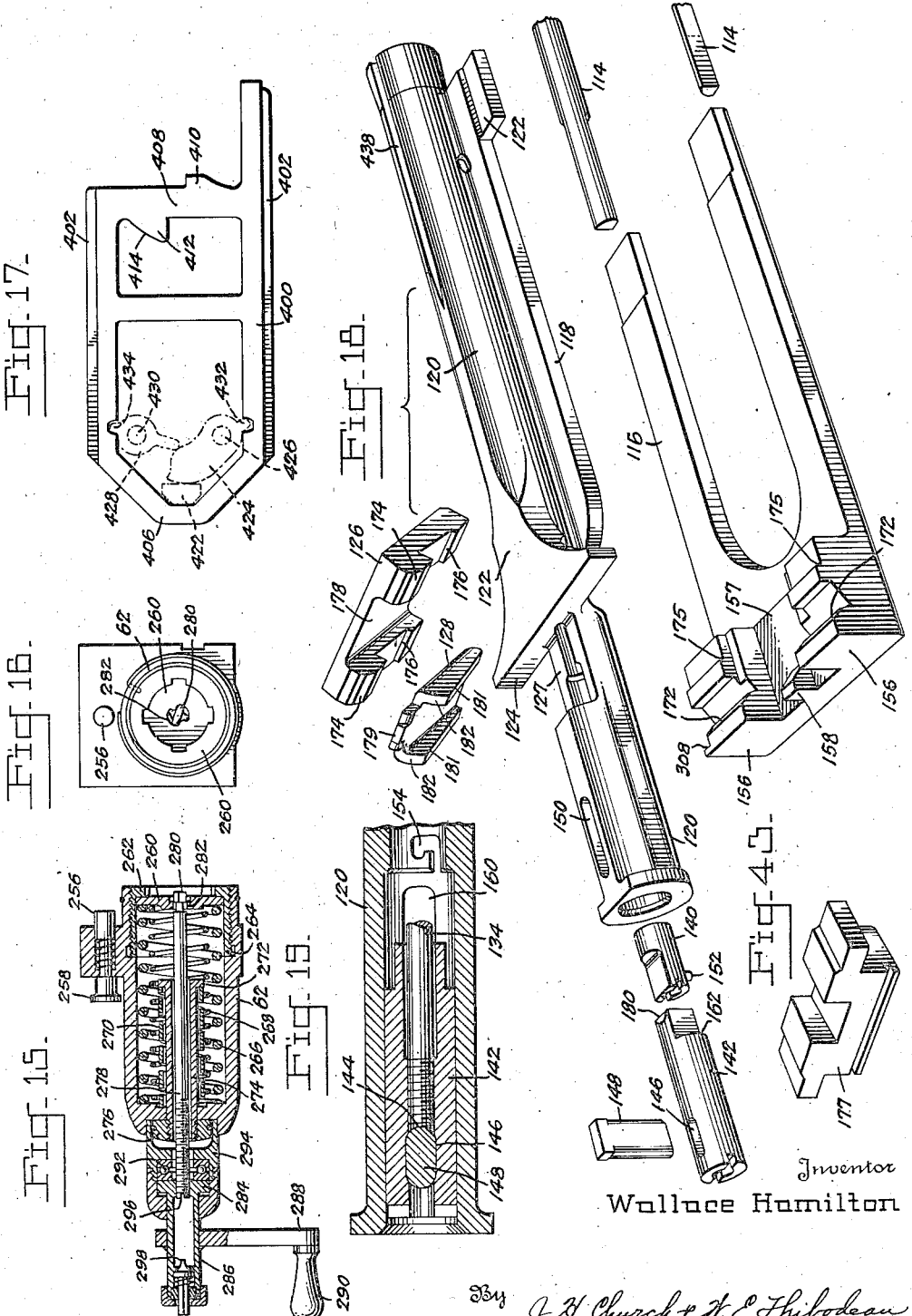
Inventor
Wallace Hamilton
Attorneys

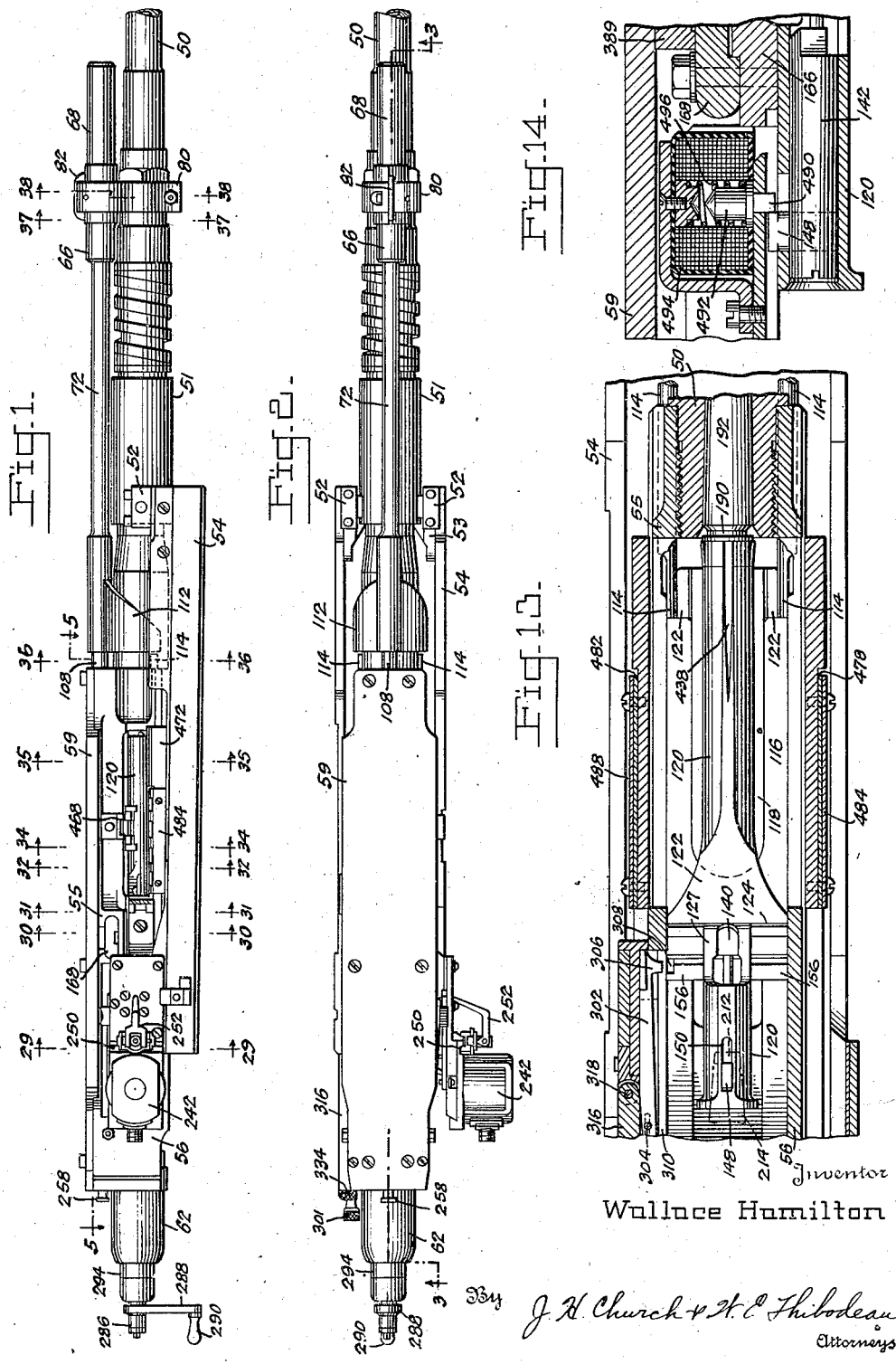

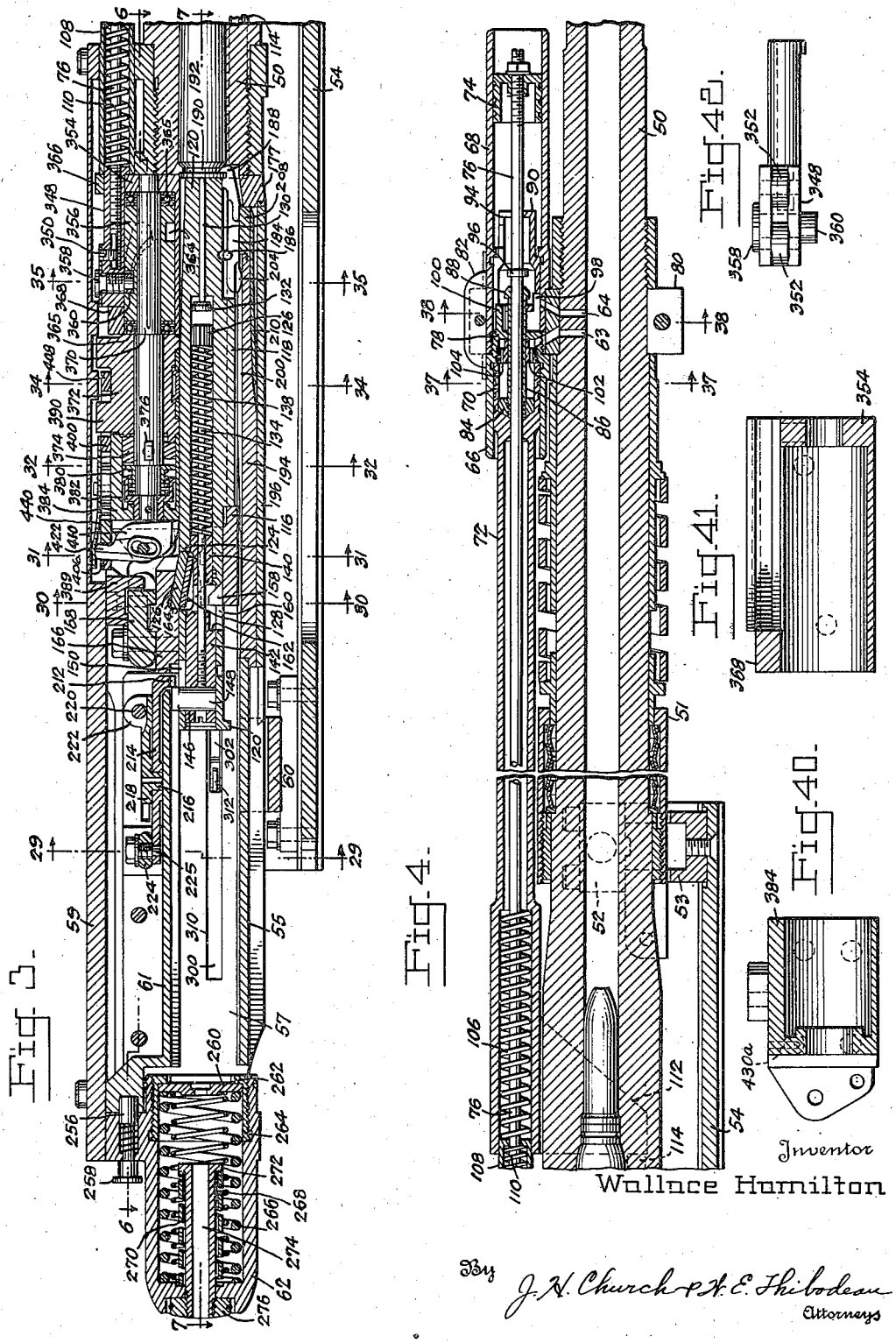

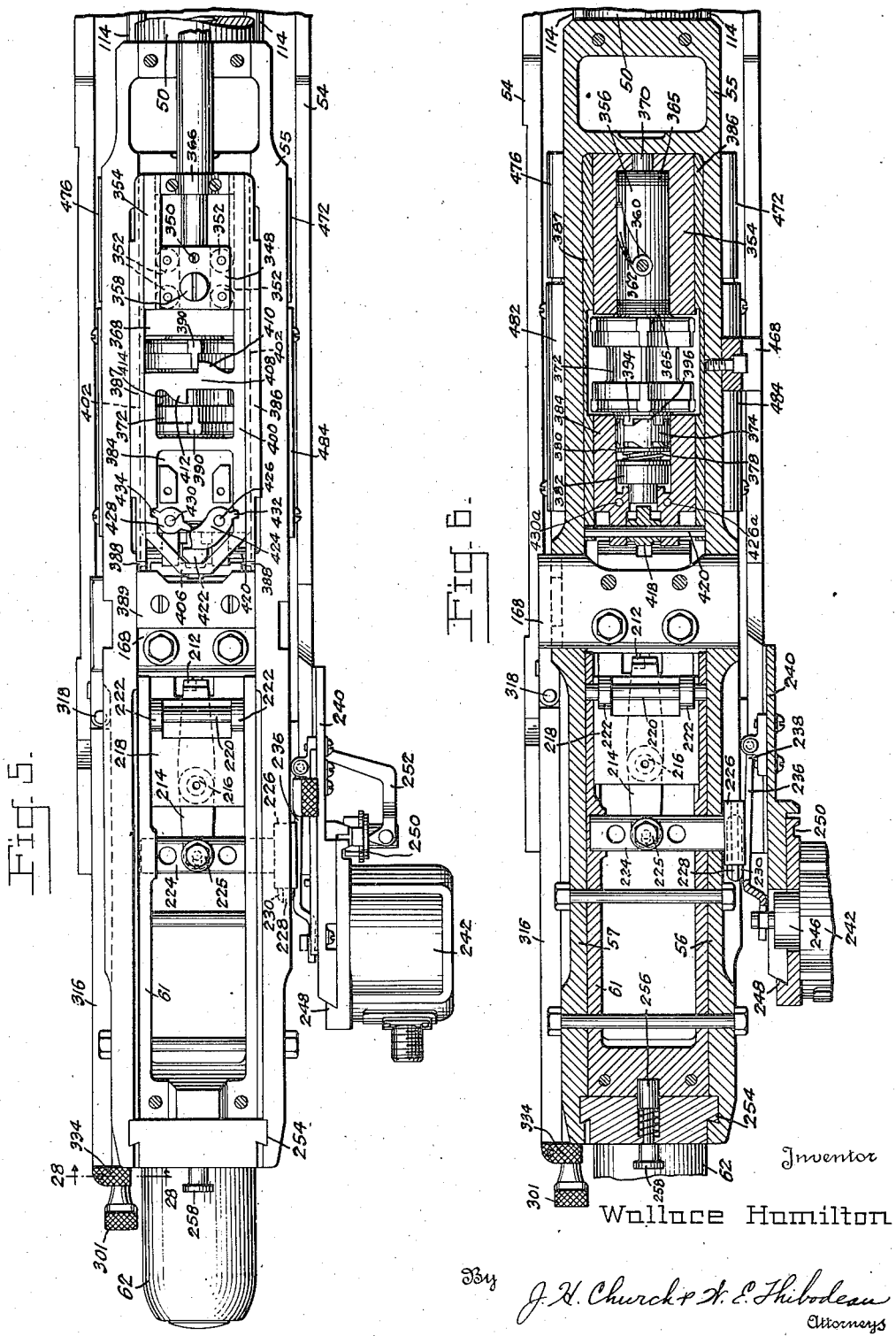

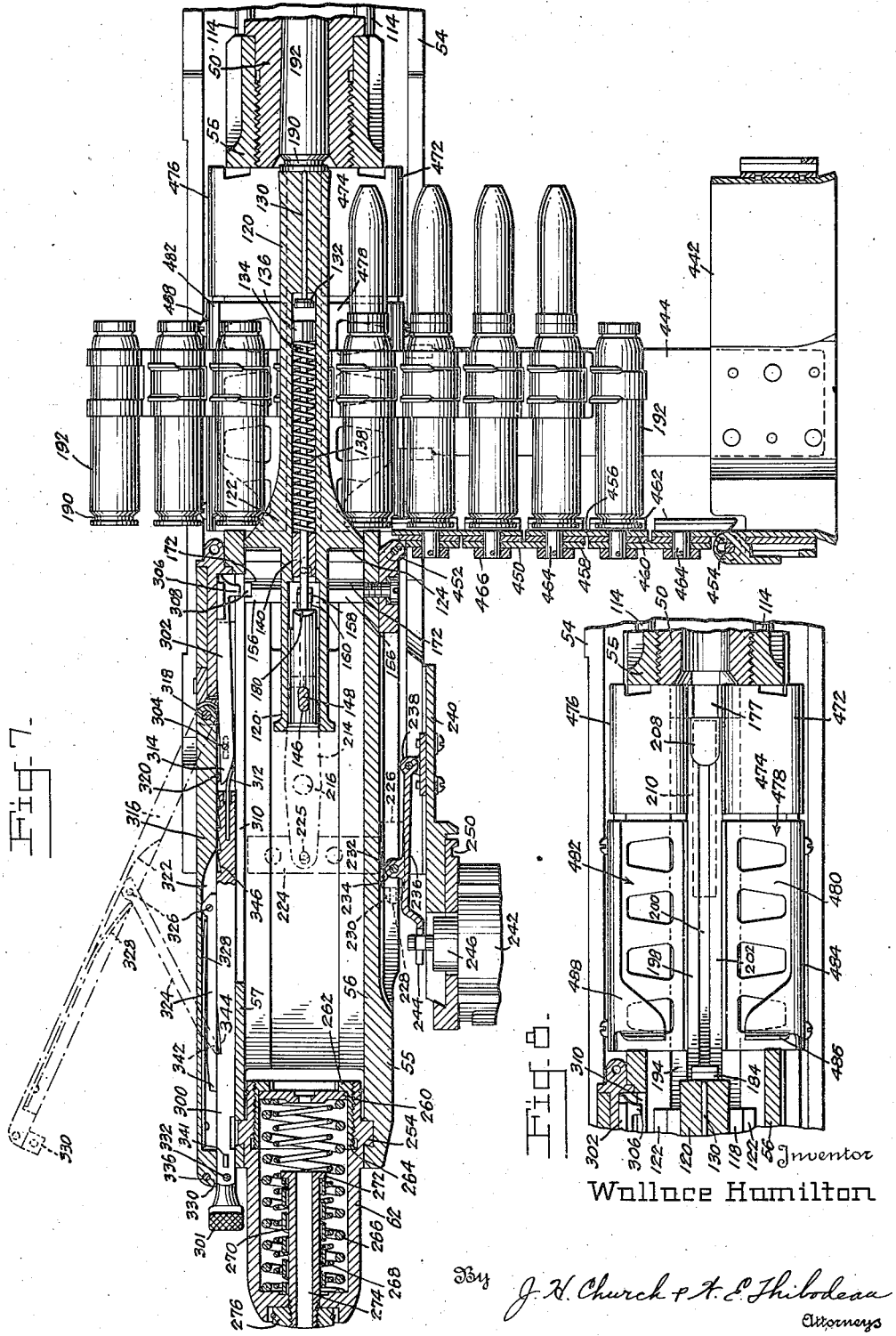

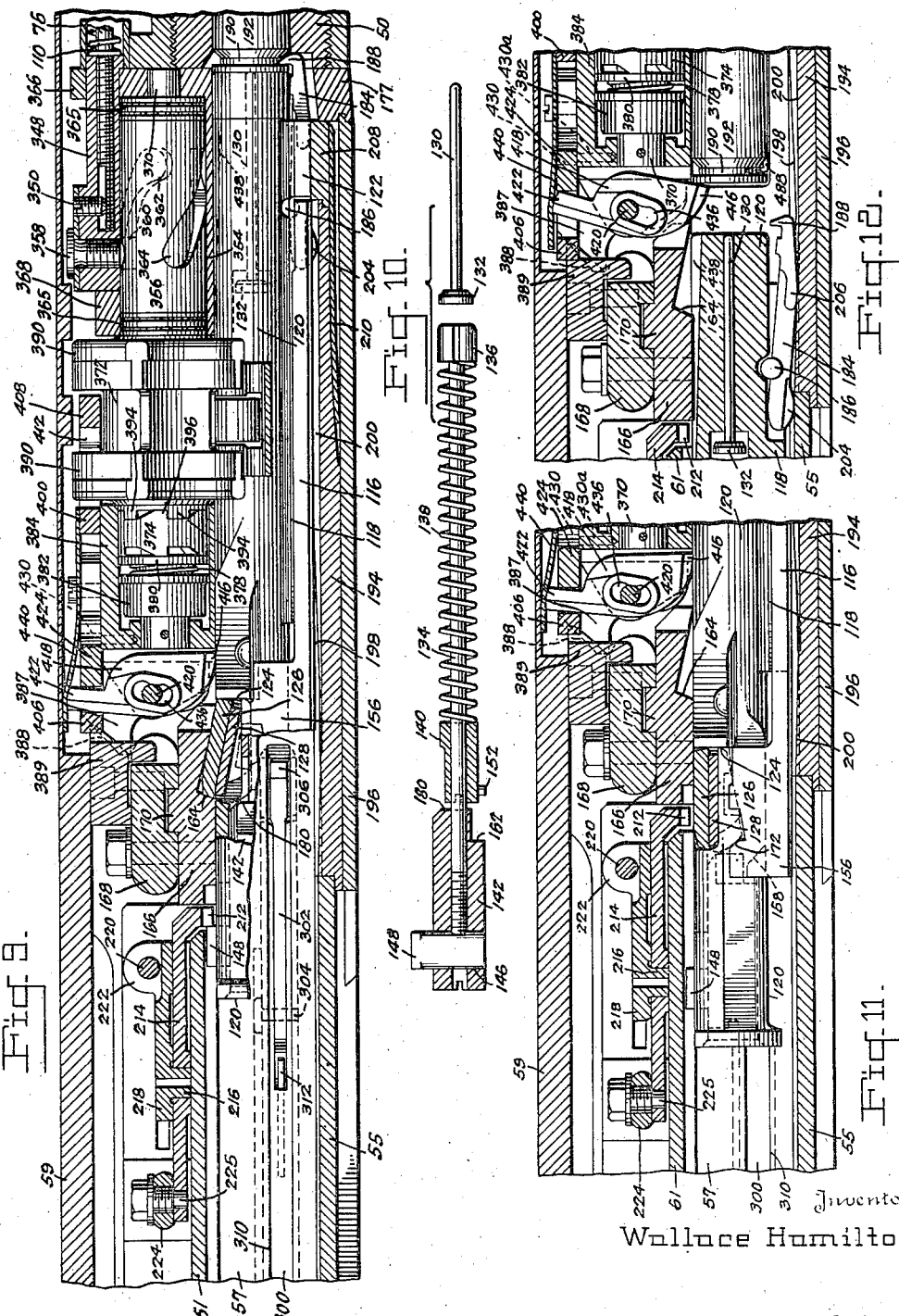

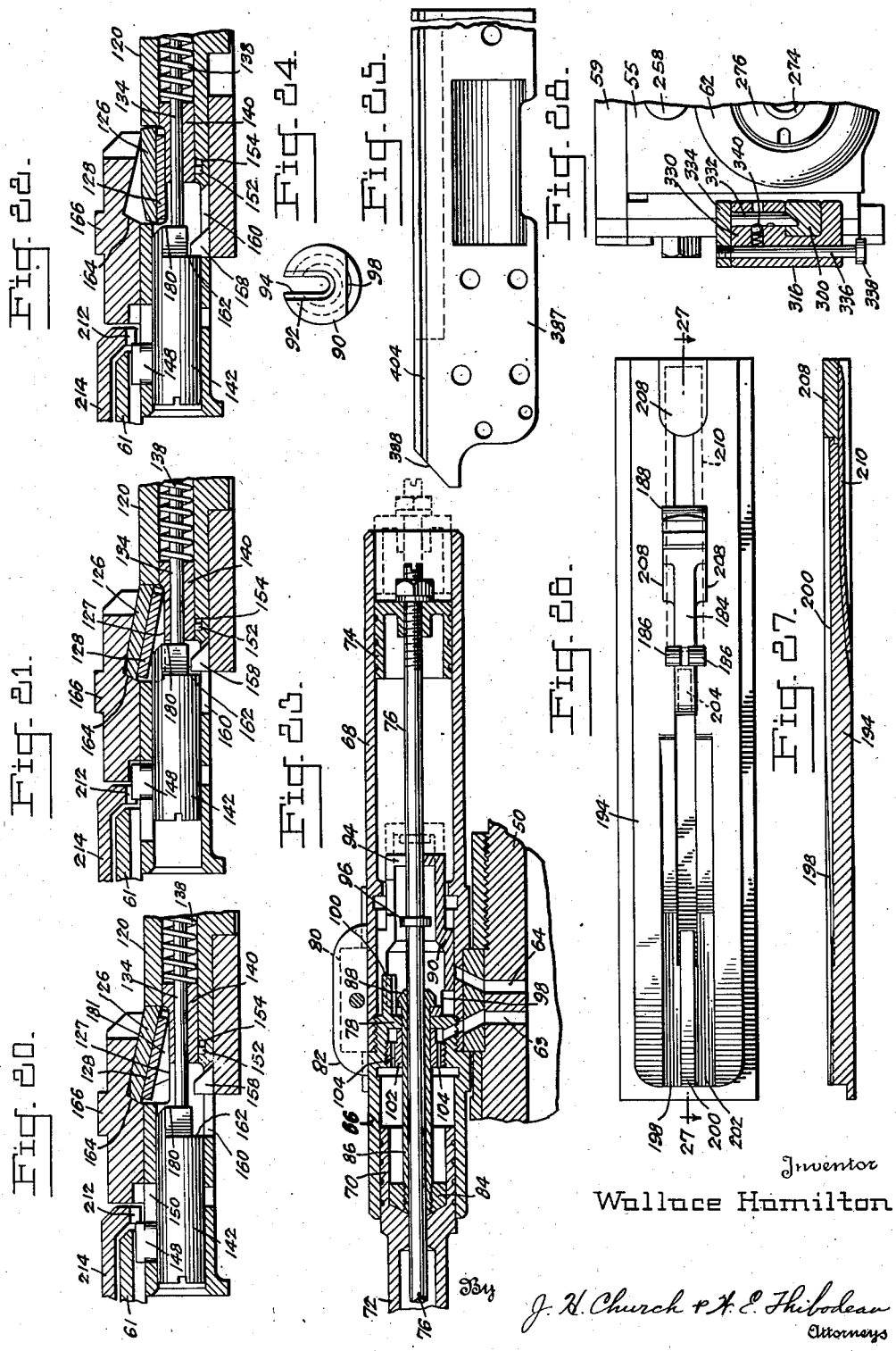

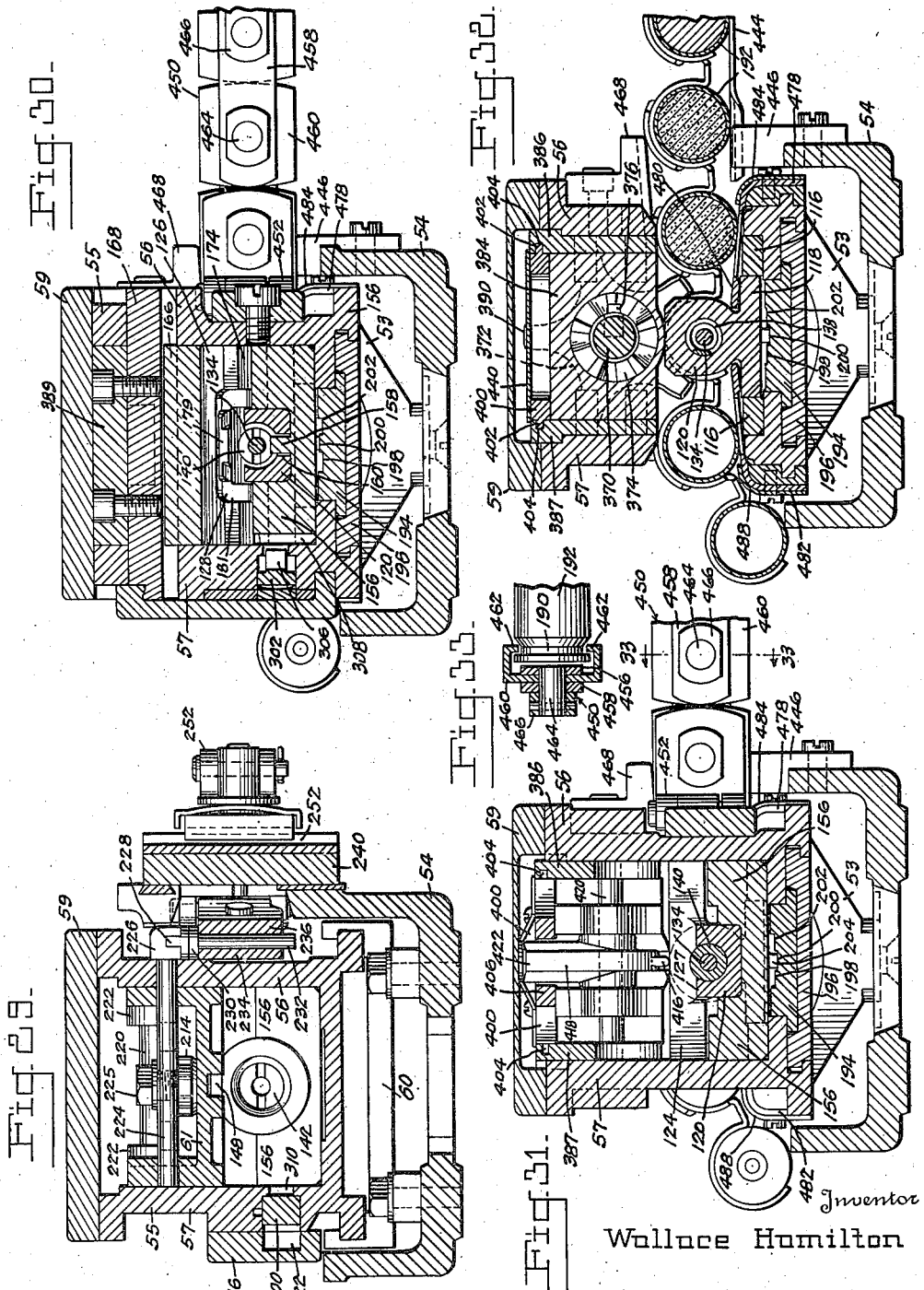

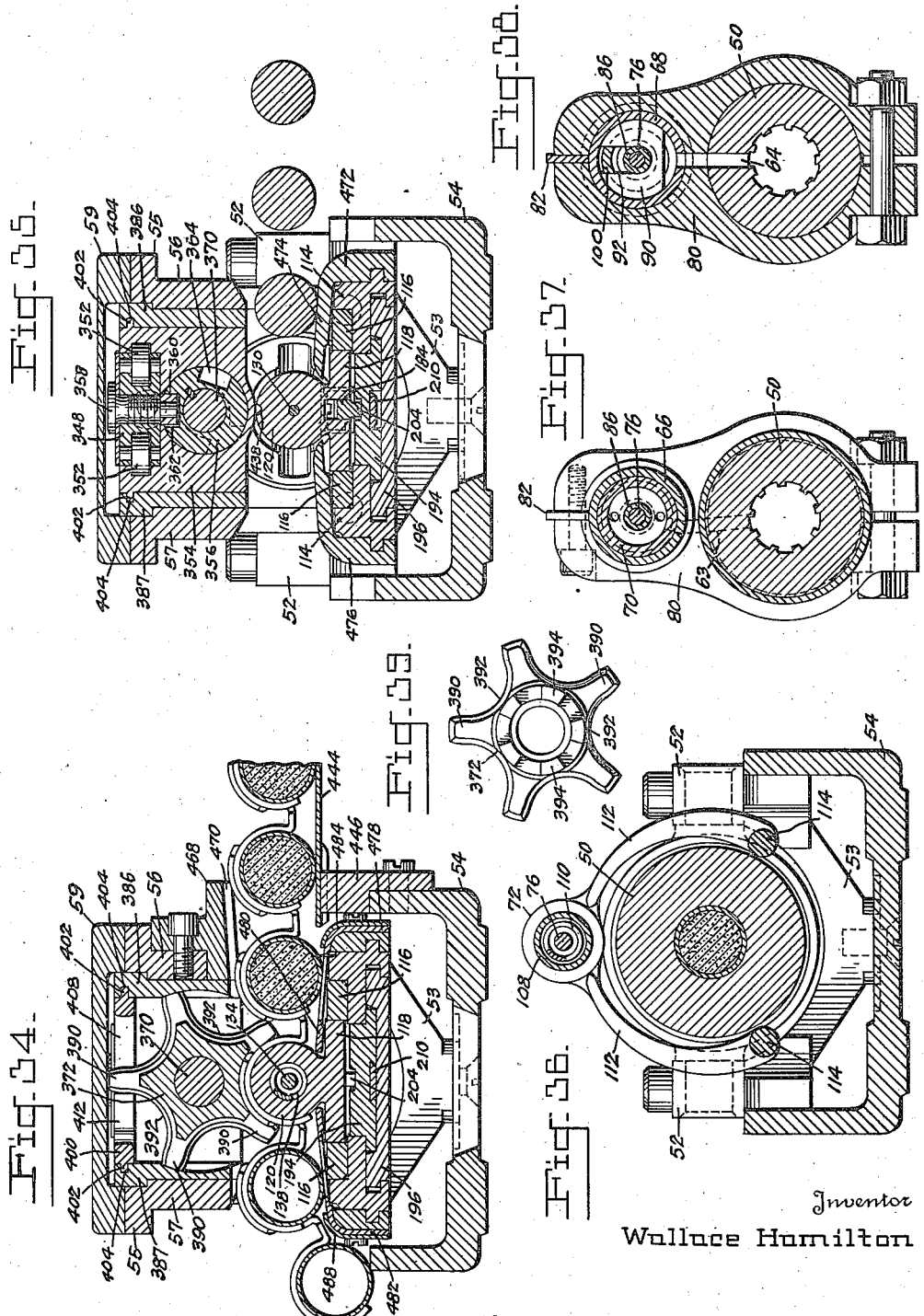

Patented Nov. 16, 1948

2,454,251

UNITED STATES PATENT OFFICE 2,454,251

CARTRIDGE FEEDING MECHANISM FOR AUTOMATIC GUNS

Wallace Hamilton, Albany, N. Y.

Application January 11, 1946, Serial No. 640,447

4 Claims. (Cl. 89—33)

This invention relates to improvements in the structure of automatic guns of the type which use belt ammunition and which are capable of continuous firing. The invention hereinafter described relates especially to 20 mm. guns such as are suitable for use in aircraft. It is an object of the invention to provide a gun of this type which can be operated by remote control, which is capable of rapid fire of the order of 800 to 1,000 rounds per minute, and in which the mechanism is relatively simple, reliable, durable and self-contained.

For a more complete understanding of the invention, reference may be had to the following description of an embodiment thereof and to the drawings of which:

Figure 1 is a side elevation of a 20 mm. gun embodying the invention.

Figure 2 is a plan view of the same.

Figures 3 and 4 are a section of the gun taken on the line 3—3 of Figure 2 but on a larger scale, the parts being shown in positions occupied when the gun is ready to fire.

Figure 5 is a section on the line 5—5 of Figure 1.

Figure 6 is a section on the line 6—6 of Figure 3.

Figure 7 is a section on the line 7—7 of Figure 3.

Figure 8 is a fragmentary sectional view on the line 7—7 of Figure 3, the bolt being retracted.

Figure 9 is a portion of Figure 3 shown on a larger scale and with some parts of the feeding mechanism shown in elevation.

Figure 10 is a side elevation of the striker assembly with certain parts thereof shown in section.

Figure 11 is a part of Figure 9 showing the positions of some of the working parts at a moment during recoil.

Figure 12 is a part of Figure 9 showing the positions of some of the working parts near the end of recoil.

Figure 13 (sheet 1) is a fragmentary section on the line 7—7 of Figure 3, some parts being shown in plan.

Figure 14 (sheet 1) is a fragmentary sectional view in a vertical plane of a modified form of trigger mechanism.

Figure 15 is a sectional view of the buffer mechanism.

Figure 16 is a front elevation of the buffer mechanism.

Figure 17 is a plan view of the escapement latch of the feed mechanism.

Figure 18 is an exploded view of the breechblock assembly.

Figure 19 is a sectional view of the rear portion of the bolt and striker extension.

Figure 20 is a fragmentary sectional view of the breechblock locking mechanism in a plane similar to that of Figure 3.

Figures 21 and 22 are similar to Figure 20 but with the parts shown in different positions of operation.

Figure 23 is a portion of Figure 4 but shown on a larger scale with the parts in a different position in the cycle of operation.

Figure 24 is a rear end elevation of a valve in the gas cylinders.

Figure 25 is an elevation of one of the side plates for the clutch and rotor housings.

Figure 26 is a plan view of a cam plate for the extractor.

Figure 27 is a section on the line 27—27 of Figure 26.

Figure 28 is a partial rear elevation of the gun, a portion being shown in a section on the line 28—28 of Figure 5.

Figure 29 is a section on the line 29—29 of Figures 1 and 3.

Figure 30 is a section on the line 30—30 of the Figures 1 and 3.

Figure 31 is a section on the line 31—31 of Figures 1 and 3.

Figure 32 is a section on the line 32—32 of Figures 1 and 3.

Figure 33 is a section on the line 33—33 of Figure 31.

Figure 34 is a section on the line 34—34 of Figures 1 and 3.

Figure 35 is a section on the lines 35—35 of Figures 1 and 3.

Figure 36 is a section on the line 36—36 of Figure 1.

Figure 37 is a section on the line 37—37 of Figures 1 and 4.

Figure 38 is a section on the line 38—38 of Figures 1 and 4.

Figure 39 is an end elevation of the feed sprocket wheel.

Figure 40 (sheet 2) is a longitudinal section of the clutch housing.

Figure 41 is a longitudinal section of the rotor housing.

Figure 42 is a side elevation of the rotor roll guide.

Figure 43 is a perspective view of the bolt stop member.

As indicated in Figures 1 and 2, the gun embodying the present invention comprises a barrel or tube 50 connected through recoil mechanism, generally indicated as 51, to trunnion blocks 52 which are part of a bracket 53 mounted on a cradle 54. Screw-threaded to the rear end of the barrel or tube 50 is a receiver body 55 which contains most of the working parts of the gun, and consists of an elongated steel box having side walls 56 and 57 and a removable cover 59. The rear portion of the receiver is slidably supported by a receiver guide 60 (Figure 29) which is secured to the cradle 54. A trough-shaped receiver slide 61 (Figures 3, 5, 6 and 29) is secured within the rear portion of the receiver sufficiently above the bottom thereof to guide the bolt assembly as hereinafter described. At the rear end of the receiver body 55 is the buffer assembly 62.

Gas cylinders

Power for unlocking the breech and for operating the feed mechanism is obtained by utilizing gas pressure from the propelling gases behind the projectile. A small portion of these gases is bled off through two ports 63 and 64 into respective gas cylinders 66 and 68 after the projectile has travelled past these ports. (See Figures 4, 23, 37 and 38.) The gas cylinder 66 is the unlocking cylinder and contains a piston 70 which actuates a sleeve 72. As hereinafter described, rearward movement of the sleeve 72 results in the unlocking of the breechblock to permit the retraction of the bolt, the extraction of the empty cartridge case from the firing chamber, and the feeding of a new round into the firing chamber.

The forward gas cylinder 68 is the cylinder supplying the motive power for the feed mechanism. It contains a piston 74 to which is secured a connecting rod 76. By reciprocation of this rod, the feed mechanism is actuated as hereinafter described. The feed cylinder 68 is screw-threaded to the unlocking cylinder 66, the latter having an end wall 78 which serves as a partition between the two cylinders. The cylinders are secured to the barrel or tube 50 by a bracket 80 and are locked against rotation by a key 82 gripped by the bracket 80. The piston 70 is hollow and contains a plug 84 which is slidably fitted therein. Secured to the plug 84 is a valve sleeve 86 which slides upon the connecting rod 76 and is slidably fitted through a central aperture in the end wall 78. The sleeve 86 has a head 88 which engages within a slide valve 90. The rear portion of the valve 90 is slidably fitted in the feed cylinder 68 and has a vertical slot 92 (Figure 24) in its rear end wall in which the sleeve 86 is fitted. The forward portion of the valve 90 has a smaller diameter and the forward wall has a vertical slot 94 to receive the connecting rod 76. Rearward movement of the valve 90 is imparted by the sleeve 86. Forward movement of the valve is imparted by a flange 96 on the rod 76 which engages the forward wall of the valve. The bottom of the valve at the rear end thereof is slabbed off to form a port 98 which registers with the port 64 when the valve is in its forward position. Movement of the valve to the rear cuts off the port 64. A slot along the top of the valve maintains free passage of gas from the interior of the valve to the rest of the cylinder 68. A tongue 100, projecting forward from the end wall 78, engages in the slot 92 to prevent any rotation of the valve 90. Within the forward part of the unlocking cylinder 66 is a gas plug 102 having a pair of small passages 104 therethrough to regulate the flow of high pressure gas into the cylinder chamber from the barrel or tube 50. A compression spring 106 (Figure 4) within the sleeve 72 bears against the forward end of a fixed housing 108 and presses the piston 70 forward. The housing 108 contains a compression spring 110 which, as hereinafter described, presses the feed piston 74 rearward. The normal positions of the gas cylinder mechanisms are shown in Figure 4, the piston 70 being in its forward position, the piston 74 being in its rearward position, and the valve 90 being forward so that the port 98 registers with the port 64. When a projectile passes the ports 63 and 64, a blast of high-pressure gas enters the chambers in the cylinders 66 and 68 through these ports. The unlocking piston is forced to the rear and with it the plug 84 which acts through the sleeve head 88 to move the valve 90 so as to close the port 64. This traps the gas which has entered the chamber in the cylinder 68 so that pressure is maintained on the piston 74 until the feed mechanism is released for operation as hereinafter described. The last part of the forward movement of the feed piston 74 causes the flange 96 to pull the valve 90 forward, opening the port 64 to relieve residual pressure within the cylinder 68. The springs 106 and 110 restore the pistons to their normal positions. The inertia of the valve 90 during the brief intervals of recoil and counter recoil aids in its proper operation. Thus its inertia during recoil tends to give it relative forward movement ensuring an open port 64 to receive explosion gases from the tube or barrel 50, and likewise, its inertia during counter recoil tends to give it rearward movement which is desirable at this stage of the cycle.

Breechblock assembly

Welded or otherwise secured to the rear end of the unlocking sleeve 72 is a yoke 112 which engages the forward ends of a pair of push rods or tappets 114. The tappets bear against the forward ends of a U-shaped breechblock slide 116 (Figure 18). Slidably fitted in the space between the arms of the slide 116 is the bottom plate 118 of the bolt 120. Projecting laterally from the forward end of the bottom plate 118 are feet 118' which at times engage the forward ends of the slide 116 between the tappets 114. The body of the bolt 120 is generally cylindrical with a widened intermediate part 122 having a transverse thrust surface 124 which bears against the breechblock lock 126 when the bolt is locked for firing. The portion of the bolt to the rear of the thrust element 122 is squared (Figures 30 and 31) and the upper part of this rear portion is cut away at 127, forming a recess to receive a breechblock lock 126 and a striker release 128, both of which members straddle the bolt at this point, the forward edge of the lock 126 bearing directly against the thrust surface 124 of the bolt. The bolt 120 has a bore extending from end to end thereof but having three portions of different diameters, as indicated in Figure 3. The portion of smallest diameter is at the forward end of the bolt, this diameter being just large enough to receive the shank of a firing pin 130 which has a head 132 within the mid portion of the bolt bore. This mid portion also contains a striker pin 134 (Figure 10) having a head 136 behind which is a helical compression spring 138 surrounding a portion of the pin 134. The rear portion of the pin extends slidably through a cylindrical spring retainer 140, the end portion of the pin being screw-threaded into a cylindrical striker pin extension 142 (Figure 19). In order to prevent unscrewing of the striker pin when in use, the rear end of the pin is transversely grooved as at 144 to register with the rounded forward end of a vertical slot 146. Fitted in the slot 146 is a firing pin key 148 the rounded forward edge of which also fits in the groove 144 in the end of the striker pin to keep the pin from turning. The firing pin key 148 projects up through a slot 150 in the bolt 120 and thus keeps the striker extension 142 from turning. This slot is long enough to permit a limited relative movement between the striker assembly and the bolt (Figures 20-22).

As hereinafter described, the upper portion of the key 148, which projects above the bolt is engageable by the sear to prevent firing of the gun until the key is released.

The spring retainer 140 is provided with a small lug 152 which enters a bayonet slot 154 (Figure 19) in the bore of the bolt to anchor the spring retainer with respect to the bolt. The spring 138 is under continual compression between the retainer 140 and the striker head 136 so that the striker head 136, pin 134 and extension 142 are constantly pressed forward.

The breechblock slide 116 is made with upstanding blocks 156 separated by a channel 157 in which a portion of the bolt 120 slides. In this channel is an upstanding cocking lug 158 which projects up through a slot 160 (Figures 20-22) in the bottom of the rear portion of the bolt to engage a shoulder 162 on the under side of the striker extension 142 (Figure 10). The slot 160 limits the relative rearward movement of the slide with respect to the bolt. Relative forward movement of the slide is limited by the bottom plate 118 when the curved rear end of the plate is engaged by the corresponding curved edge of the slide. When the slide is in its forward relative position (Figure 20), the breechblock is locked by the engagement of the breechblock lock 126 with an inclined shoulder 164 on the under side of the breechblock lock key 166 which is securely bolted to the receiver key 168 with a tongue-and-groove joint 170, the receiver key being securely anchored with its ends fitted in apertures in the side walls of the receiver (Figures 1, 6 and 30). Thus the reactive thrust of each explosion is transmitted from the cartridge case to the receiver through the bolt 120, and the lock 126, the key 166 and the receiver key 168.

For the operation of the lock 126 inclined cam faces 172 are provided on the upstanding parts 156 of the slide 116 to engage corresponding faces 174 on the lock 126 when the slide moves forward with respect to the bolt so as to elevate the rear end of the lock into the locking position shown in Figure 20. The slide block 156 also has forward cam faces 175 which are lower than the faces 172 and are engaged by corresponding cam faces 176 on the lock 126 to elevate the forward end of the lock 126 to a lesser extent when the slide moves forward with respect to the bolt. Thus when the lock 126 is moved into locking position, it is bodily lifted as well as being tilted. By this combination of a bodily lift with the tilt to move the lock 126, a smaller angle of tilt is required for the locking position. This is advantageous because the thrust of the breechblock is horizontal and the tilt of the lock produces a vertical component which should be kept at a minimum. Without the lift to reduce the tilt, a much longer lock would be necessary, which would be objectionable. After the gun is fired, the resulting rearward thrust of the tappets 114 against the slide moves the slide first to unlock the bolt 120 by moving the supporting elements on the upstanding parts 156 from their supporting position, thus permitting the inclined shoulder 164 to cam the lock down to its unlocked position. The tappet thrust also cocks the striker 136 and then assists the blowback of the cartridge shell in kicking the bolt assembly back against the buffer 62 to clear the way for a new round to move into position for ramming. The breechblock compresses the springs of the buffer and rebounds forward to ram the new round into the firing chamber, pushing with it the slide 116. When the forward movement of the bolt is stopped by a bolt stop member 177 (Figures 9 and 43), the slide continues by its momentum to its forward relative position to lock the breechblock by camming up the lock 126. As this locking movement of the slide is relatively slow compared with the necessary velocity of the striker for effective impact on the firing pin, it is necessary to hold back the striker assembly during the locking movement of the slide since otherwise the striker would be slowed down to the speed of the slide by the engagement of the striker extension 142 with the cocking lug 158. Hence a striker release member 128 is employed to engage the striker extension 142 and hold it back after the bolt has been stopped until the locking movement of the slide 116 has been nearly completed. The striker release 128 fits loosely in a channel 178 in the under side of the breechblock lock 126 and rides on the cutaway portion of the bolt (Figure 18). The striker release fits loosely in this depression just behind the thrust surface 124 of the bolt and is provided with an abutment face 179 at its rear end to engage a shoulder 180 on the forward end of the striker extension 142 (Figure 10), when the release member 128 is in its horizontal position shown in Figures 11 and 22. The release member 128 has downwardly projecting side wings 181 the rear end of each of these wings being a sloping cam edge 182 which is adapted to engage the cam surfaces 172 on the slide 116 to elevate the rear end of the release member 128 and release the striker. The cam edges 182 on the release member 128 are forward of the cam surfaces 174 on the lock 126, the spacing being such that when the bolt stops its forward ramming movement, the initial additional forward movement of the slide cams the lock 126 up to its locking position, but the release member 128 remains horizontal until the slide nearly reaches its forward limit. The final fraction of slide movement elevates the rear end of the release member 128 and releases the striker which is then free to be moved forward by the spring 138 to strike the firing pin 130.

Owing to the rapidity of the oscillations of the breechblock mechanism during continuous firing, the useful life of the striker spring 138 is apt to be very short, probably on account of longitudinal waves set up in the spring itself. I have found that by packing the spring with a heavy, viscous grease, its useful life can be indefinitely extended.

Extractor

The extractor consists of a single member 184 loosely embedded in a longitudinal groove in the bottom plate 118 of the bolt 120 (Figures 9 and 12). The extractor has trunnions 186 which are embedded in a short transverse slot in the bottom plate 118. The extractor projects far enough forward of the end of the bolt for its claw 188 to enter the extractor groove 190 of a rimless cartridge case 192 when the latter is seated against the forward end face of the bolt. The fore portion of the extractor which terminates in the claw 188 is considerably wider than the shank of the extractor from which the trunnions 186 project. As the extractor moves forward and back with the bolt, it rides on a cam plate 194 (Figures 9, 12, 26, 27, 30, 31 and 32) which rests on a bottom plate 196 of the receiver 55. The plate 194, as clearly shown in Figure 26, has three parallel cam tracks 198, 200 and 202. As indicated in Figure 27, the middle track starts with a high point at the rear end of the plate 194 and slopes to a low level which continues to the forward end of the plate. The outer tracks 198, 202 start to run at a low level from the rear end of the plate 194, then slope up to a high level which continues to the forward end of the plate. A follower element 204 (Figure 12) near the narrow rear end of the extractor rides on the middle cam track 200. Two follower elements 206 on the wider forward portion of the extractor ride on the outer tracks 198, 202. The followers and tracks are so arranged that when the follower 204 is riding uphill on its track 200, the followers 206 are riding downhill on their tracks, and vice versa, thus imparting rocking movements to the extractor about the axis of its trunnions 186. These rocking movements occur when the bolt is appproaching or leaving its rearmost position. When the bolt is in such position, the extractor claw 188 is down so that when moving rearwardly the extractor releases the empty case, and when the bolt is moving forward to ram the next round the claw can pass under the extractor rim of the cartridge case.

It is evident that the cam actuated rocking movement of the extractor is entirely positive and there is no spring to vibrate or break. It occasionally happens that when the belt link holding the round is weak, the bolt strikes the base of the round to ram it into the firing chamber and the round jumps ahead of the bolt so that the extractor claw 188 rises behind the round rather than in the groove 190 where it belongs. The round is then pushed by the extractor until it is not quite completely chambered, and the bolt still has a short distance to go to finish its stroke. If the extractor could not yield, it would be jammed against the base of the round by the momentum of the bolt and would jam the gun. For this reason a yielding plate 208 is set in flush in the forward end of the cam plate 194 and is resiliently upheld by a leaf spring 210. The cam followers 206 ride on the yielding plate 208 when the bolt approaches the forward end of its stroke so that if the extractor claw 188 is then against the base of the round, it can snap into the groove 190 without injury to the round or to itself and permit the bolt to complete its ramming stroke and reach its forwardmost, or battery, position, thus allowing the slide and lock action to lock it against rearward motion.

As indicated in Figure 7, the gun is adapted to use belt ammunition wherein the rounds are frictionally held by metal links. When ramming a round, the bolt projects through the link from which it has pushed the round. After the round has been fired, the empty case returns to the link before it is released by the extractor. To facilitate the reentry of the cartridge case into the belt link, the bolt is given a slight bulge near its forward end so that its diameter at that point is slightly greater than that of a cartridge case. This spreads the link just as the empty case is about to enter.

Sear and trigger mechanism

The sear 212 extends down from the forward end of the sear lever 214 which is pivoted at its mid point 216 (Figures 6, 9 and 11) to the sear cover 218 so that the sear can be moved into a position in front of the firing pin key 148 to prevent firing. The key 148 cannot move ahead of the sear, the limit of its forward movement being shown in Figure 21. Hence the sear cannot catch behind the key 148.

The sear cover 218 is supported in grooves in opposite side walls of the receiver slide 61 and is secured in place by a pin 220 which passes through the side walls of the receiver slide and through two upstanding ears 222 on the sear cover.

The sear lever 214 is actuated by a trigger 224 which is a transverse bar slidably fitted in slots through the walls of the receiver slide and connected to the rear end of the sear lever by a stud 225. One end of the trigger projects through a side wall of the receiver body 55, this projecting end having a crosshead 226 thereon with a groove slidably fitted by a tongue 228 on a trigger slide 230 (Figure 29). The trigger slide has a vertical stem 232 which fits the bore of a gudgeon 234 at an intermediate point of the solenoid lever 236. This lever is hinged at one end 238 to a bracket 240 which carries the solenoid 242 and is secured to the cradle 54. The free end 244 of the lever 236 is forked and engages in notches in the armature 246 (Fig. 7) of the solenoid 242. The solenoid is removably mounted on the bracket 240 in the usual manner by an overlapping flange 248 at one end of the solenoid base and a tongue and groove connection 250 at the other end of the base, the latter being locked by a cam lever 252 (Figures 5 and 29). When the solenoid is energized, its armature acts through the lever 236 to pull the trigger 224 to the right. This rocks the sear lever 214 and moves the sear out of the path of the firing pin key 148. The reason for the tongue and groove coupling between the trigger and the trigger slide is apparent when it is remembered that the trigger recoils with the gun and the lever carrying the trigger slide is mounted on a member fixed to the cradle.

Buffer

The buffer 62 is mounted at the rear end of the gun and is secured to the receiver 55 by a dovetail joint 254 (Figures 5, 6 and 7). A spring-pressed plunger 256 with a finger knot 258 locks the buffer in its proper position. Within the open forward end of the buffer housing is a plate or disc 260 which is spring-pressed against an inner flange 262 on a thimble 264 which is screw-threaded into the forward end of the buffer housing. Pressing against the rear face of the disc 260 is a heavy compression spring 266 and a lighter spring 268 nested within the heavy spring. Both springs are pre-loaded and are seated against the rear wall of the buffer housing. Within the springs 266 and 268 is a heavy snubber spring 270 pre-loaded between the rear wall of the buffer housing and a flange 272 on a sleeve 274 which extends slidably through an aperture in the rear end of the housing and has a circular nut 276 screw-threaded on the projecting end portion and seated in a recess in the end of the housing.

When the gun is fired, the bolt 120 is kicked back by the combined action of the thrust of the unlocking gas piston 70 acting through the tappets 44 and slide 116, and the blow-back acting directly on the bolt through the cartridge case. In normal action the rear end of the bolt strikes the disc 260 of the buffer forcing it back against the resistance of the spring 266 and 268 until the disc just reaches the forward end of the sleeve 274. The stored-up energy of the two springs then impels the bolt forward to ram the fresh round which is fed into line with it during its rebound from the buffer. In cases where there is excessive force in the blowback, due to an overcharged round or other causes, the bolt will push the disc 260 against the sleeve 274, compressing the snubber spring 270, thus providing a yielding instead of a solid stop for the bolt when its rearward velocity is higher than normal.

*Charging mechanism*

The gun is charged for the initial shot by manually retracting the buffer disc 260, moving the bolt back into contact with it, then suddenly releasing the disc. A device for retracting the disc is illustrated in Figure 15 and consists of a rod 278 which is thrust forward through the buffer from the rear end thereof. On the forward end of the rod is a key 280 which passes through a keyhole 282 in the center of the disc and turns 90° to lock the rod to the disc. The key 280 turns in a recess in the front face of the disc which, as indicated in Figure 16, is shaped to limit its turn to 90°. The rear end portion of the rod 278, which projects beyond the rear end of the buffer housing, is screw-threaded and is engaged by a nut 284 having a tubular extension 286 to which is permanently secured a crank 288 and handle 290. Rotation of the nut 284 by means of the crank 288 draws the rod 278 toward the rear. To take the reactive thrust of this pull, the nut 284 is arranged to bear against a ball bearing assembly 292 mounted in a housing 294, the forward edge of which fits into the clearance between the periphery of the nut 276 and the wall of the recess in which it is seated. When the rod 278 and disc 260 have been retracted by operation of the crank 288 to compress the buffer springs sufficiently, the disc can be released by turning the rod back until the key 280 registers with the hole 282. For this purpose a slot 296 is provided in the rear end of the rod 278 to be engaged by an ordinary screw driver if the tubular extension 286 is left open at its rear end. As shown in Figure 15, however, a short screw driver blade 298 is loosely mounted and keyed in the rear end of the nut extension 286. When the rod 278 is retracted until it reaches the blade 298, the slot 296 receives the blade. With the blade held in engagement with the slot by the thumb of the operator, a 90° turn backwards allows the key 280 to release the disc 260.

*Breechblock retracting mechanism*

To unload the gun, the breechblock must be unlocked and retracted. For this purpose a retractor rod 300 having a grip 301 at its rear end is slidably fitted in a groove in a side wall of the receiver (Figures 7 and 29), both rod and groove having a square cross-section. The forward end portion of the rod 300 is slotted for about one third of its length. In the slot a latch 302 is pivoted to the rod at 304 (Figures 7 and 30).

The forward end of the latch 302 projects beyond the end of the rod 300 and has a nose 306 adapted to engage in a vertical slot or recess 308 in the breechblock slide 116 through an elongated slot 310 cut through the remaining thickness of the receiver wall. A leaf spring 312 secured in the rod 300 presses against the rear end 314 of the latch 302 to press the nose 306 toward the recess 308. The nose is normally held out of engagement with the recess by a retractor cover plate 316 which is hinged at 318 to the side of the receiver and has a button 320 on its inner face normally pressing against the end 314 of the latch opposite the spring 312. The cover plate 316 has a long shallow groove 322 in its inner face in which a pawl 324 is pivoted at 326. A leaf spring 328 is mounted in the groove 322 behind the pawl to press it away from the cover 316. The cover 316 is normally secured against the side of the receiver by a locking device shown in Figures 5 and 28. This device is located in a short L-extension 330 at the rear end of the cover 316 which is horizontally notched to receive the rod 300 and is vertically drilled for a locking assembly consisting of a vertical latch 332 extending down from a crosshead 334 which normally rests on the upper surface of the L-extension 330. A stop pin 336 is screw-threaded at its upper end into the crosshead 334 and extends down through the L-extension 330. A head 338 on the stop pin limits the upward movement of the lock assembly. The latch 332 has two notches adapted to receive a spring-pressed detent 340 so as to hold it in either its locked or unlocked position. In Figure 28 the locked position is shown wherein the bevelled lower end of the latch 332 projects into a hole in the upper surface of the rod 300. When the lever is locked, the rod 300 is retained in its groove by a short tongue 341 (Figure 7).

To unload the gun, the pin head 338 is pressed upward to elevate the latch 332 clear of the rod 300. The retractor cover 316 is then swung away from the receiver. As it swings out, the nose 342 of the pawl 324 is kept against the side of the rod 300 by the spring 328. The latch 302 is also released to be rocked by the spring 312 to project its nose 306 into the recess 308 in the slide 116. When the cover 316 has been swung out far enough for the pawl nose 342 to enter a notch 344 in the side of the rod 300, as indicated in broken lines in Figure 7, the cover is then swung back toward the receiver with a quick movement. The toggle action of the pawl 324 and the portion of the cover 316 between the pawl pivot 326 and the cover hinge 318 forces the rod 300 to the rear, pulling the slide 116 with it. This unlocks the bolt which can then be retracted by pulling on the grip 301. If the cartridge case sticks when it reaches the belt loop which it is to enter, the retractor cover 316 can be used as a jack to force the rod 300 rearward step by step. For this purpose a series of notches 346 are formed in the side of the rod. These can be successively engaged by the toe 342 of the pawl 324 by swinging the cover 316 on its hinge. The toggle action on the inward swings results in a retracting force on the rod 300 greatly in excess of the input manual force. The rod retracts the slide 116, the bolt 120 and the round engaged by the extractor 184.

*Feed mechanism*

After the gun is fired, the bolt and the empty cartridge case are thrust rearward by gas pressure as soon as the breechblock is unlocked. The case enters its loop in the ammunition belt and is released by the extractor 184 just as the rear end of the bolt reaches the buffer plate 260. The momentum of the bolt forces the plate back against the resistance of the buffer springs until the bolt rebounds forward. During this brief interval, the ammunition belt is fed forward to move the empty case out of line with the bolt and to replace it with a fresh round in position to be rammed.

The feed mechanism is actuated by reciprocation of the connecting rod 76, the forward and rearward strokes of this rod being caused by gas pressure on the piston 74 and by the spring 110, respectively. The rear end of the rod 76 is screw-threaded into a rotor roll guide 348 (Figures 3, 5, 9 and 42). A setscrew 350 in the guide bears against a flat on the threaded end of the rod 76 to prevent the latter from unscrewing. The roll guide has four rolls 352 mounted therein with a segment of each projecting from a side of the guide. The guide travels in a longitudinal channel in the top of the rotor housing 354 (Figures 35 and 41) which is a heavy block having a bore in which rotates the cylindrical rotor 356 and which is directly below the channel for the guide 348. The side walls of the guide channel in the rotor housing are grooved to receive the projecting segments of the rolls 352. A roll stud 358 is located on the median line of the guide 348 and projects down below it. On the lower end of the stud is a roll 360 which rides in a helical slot 362 in the rotor 356 (Figures 6 and 35) when the feed is to be from the right. It is evident that reciprocation of the guide 348 results in oscillating rotation of the rotor 356 through a limited angle. The rotor 356 has another slot 364 with its helix in the opposite sense for use when feed from the left is desired. Ball bearings 365 are employed at the ends of the rotor 356 to take the heavy axial thrusts on the rotor. Forward strokes of the guide 348 are limited by a stop member 366. Rearward strokes are limited by the engagement of the rear end of the slide with a raised portion 368 of the rotor housing 354 (Figure 5).

The rotor 356 is keyed on a shaft 370 (Figure 3) which extends rearward through a sprocket wheel 372 (Figures 34 and 39), which is free to rotate thereon, and projects beyond the sprocket wheel. On this projecting rear portion of the shaft 370 a clutch member 374 is splined adjacent to the sprocket wheel by means of a key 376 (Figures 3 and 32) which is mounted in the shaft but has a radially projecting portion riding in an interior longitudinal slot in the clutch member 374 so as to permit free axial movement of the clutch. The clutch is pressed resiliently against the rear end of the sprocket wheel by a spring 378 which surrounds a flanged thimble 380 on the shaft 370, the flange serving as a thrust washer pressed by the spring against the rear end of the clutch 374. The spring 378 is seated in and partly enclosed by a housing 382 which is pinned to the shaft 370. The clutch 374 and its spring assembly are contained in a housing 384 (Figure 40) which is rigidly secured to the rotor housing 354 by a pair of side plates 386, 387 with the sprocket wheel 372 between them (Figures 6, 25, 32, 34 and 35). These parts as thus assembled form a feed block which can be handled as a unit. The inclined edges 388 of the side plates of the feed block (Figure 25) engage under complementary surfaces of a feed block lock 389 which is bolted to the receiver key 168 to anchor the rear end of the feed block when in place (Figure 9), the forward end of the feed block having an interlock (not shown) with the sides of the receiver body.

The sprocket wheel 372 has at each end five radial arms 390 spaced by arcuate recesses 392 shaped to fit against a cartridge case or the forward portion of the bolt 120 (Figure 34). For indexing the sprocket wheel, five strong teeth 394 are formed on its rear face for engagement by teeth 396 on the clutch 374. As indicated in Figure 9, the teeth 394 on the sprocket wheel are squared on both sides, whereas the teeth 396 on the clutch are sloping on one side and squared on the other. The sloping faces cam the clutch away from the sprocket when the clutch is turned in one direction by the shaft 370 but the squared sides lock with the sprocket wheel teeth to drive the sprocket wheel when the clutch is turned in the other direction. The clutch has a set of teeth on each of its faces alternatively usable according to the desired direction of feed.

The indexing of the sprocket wheel 372 is positively and accurately controlled by an escapement latch 400 (Figures 5 and 17). The latch consists of a flat frame having side members with lateral tongues 402 thereon which slide in complementary grooves 404 in the side plates 386 and 388 (Figures 25, 32 and 34). The latch is formed with a loop 406 at its rear end, and two cross members of which the forward member 408 has a releasing lug 410 projecting forward and a camming lug 412 projecting rearward. As is evident from Figures 5 and 34, the latch 400 is mounted in such a position that the cross member 408 comes between the two sets of sprocket arms 390 which are at the ends of the sprocket wheel 372, and the lugs 410 and 412 are so arranged that one or the other is always in the path of a sprocket arm 390. Figure 5 shows the sprocket wheel in its usual position with one of the arms 390 pressed against the stop lug 410. To index the sprocket wheel, the latch 400 is moved rearward to clear the stop lug 410 from the arm 390, this movement of the latch also serving to bring the cam lug 412 into the path of the rear arms 390. As the sprocket wheel turns, a rear arm 390 strikes the cam edge 414 of the lug 412 forcing the latch forward to bring the stop lug into the path of the next successive arm at the forward end of the sprocket wheel to stop the wheel after exactly one-fifth of a revolution. The latch 400 as shown in Figure 5 is adapted for feeding from the right hand side of the gun. If it is desired to feed from the left hand side, the latch is simply turned over so that the lugs 410 and 412 will face the other way.

When the gun is fired, the blow-back energy of the empty cartridge case is utilized to kick the latch 400 to the rear so as to release the sprocket wheel 372 for a feeding step. As shown in Figure 12, the cartridge case strikes the lower end or toe 416 of an upright lever or back-stop member 418 which is rocked about a pin 420 by the impact so that its upper end 422 pushes against a lever system consisting of a lever 424 against which the end of the back stop bears directly. This lever is pivoted on a stud 426 and bears against a second lever 428 which is pivoted on a stud 430. Studs 426 and 430 are rigidly secured and held in spaced relationship in the top of housing 384 by means of a drive fit with the openings 426a and 430a respectively in the top member of said housing (Figs. 5, 6, 9 and 40). The levers have teeth 432 and 434 respectively which mesh in opposed notches in the side members of the latch 400. Thus a forward thrust of the upper end 422 of the back stop 418 acts through the lever system to thrust the latch 400 rearward. This reversal of direction of movement by means of the lever system is for the purpose of avoiding premature unlocking of the sprocket wheel by the inertia of the latch 400 during the recoil. It is evident from Figure 5 that the inertia of the latch tends to give it a forward thrust relative to the receiver, thus preventing accidental unlocking of the sprocket arm 390 by displacement of the locking lug 410. Since the permissible movement of the latch 400 is definitely limited, the back stop 418 also serves to stop the rearward travel of the empty cartridge case when it reaches its proper position in a belt link.

The back stop 418 (Figures 9, 11, 12 and 31) has a flat body disposed in a vertical plane and having a slot 436 through which the pin 420 extends. The slot is surrounded by a reinforcing rim on each side. The upper end portion 422 of the back stop is thicker than the body portion and is bevelled or rounded to fit in the loop 406 at the rear end of the latch 400. At the lower end of the back stop the toe 416 is narrow and rounded to ride in a small groove 438 in the forward portion of the bolt 120 (Figures 9, 12 and 18). This groove extends for about one-third the length of the bolt and decreases in depth from a maximum at the forward end of the bolt. When the bolt is forward, the toe 416 rides on top of the bolt and holds the back-stop in its elevated position as shown in Figures 9 and 11. When the bolt moves rearward the toe 416 is pressed into the groove 438 by a leaf spring 440 which is secured to the top of the clutch housing 384 and bears upon the upper extremity of the back-stop. By the time the forward end of the bolt reaches the toe 416, the latter has moved down in the groove into the path of the cartridge case which it stops and by which it is actuated.

*Ammunition belt guide*

Ammunition is supplied to the gun by the usual metal link belt which can be fed in from either side, the feeding mechanism being arranged accordingly as hereinbefore described. Owing to the rapid movements of recoil and counter recoil which the gun assembly has relative to the cradle during bursts of continuous fire, guiding means for the portion of the belt approaching the gun is desirable. As shown in Figure 7, a chute 442 for the ammunition is secured at some fixed point a short distance from the gun. A horizontal elongated guide plate 444 one end of which is secured to the chute 442, the other end being secured to the cradle 54 by a bracket 446 (Figure 34), acts as a slide for the portion of the belt traveling between the chute 442 and the receiver. Extending from the receiver to the rear side wall of the chute 442 is a guide 450 for the rounds, this guide being constructed of links secured together in such a manner that the guide is flexible to a limited extent in a vertical plane, but inflexible in a horizontal plane. The guide is hinged to the receiver at 452 and to the chute at 454. The guide consists of two series of links 456 and 458 secured to each other in staggered relation. Between the two series are guide elements 460 (Figure 33), each of which is a short channel with inturned flanges 462 which enter the extractor grooves of the rounds when the latter leave the chute 442. The guide assembly is held together by studs 464, two of which are welded to each of the inner links 456. These studs extend through holes in the guide elements 460 and the outer links 458 and are secured by washers 466 which are pinned on the projecting ends of the studs. The channel guide elements 460 guide the rounds into the receiver. A guide 468 is also provided for the belt links so as to keep them properly spaced from the bases of the rounds. This guide is secured to the side wall of the receiver (Figure 34) and projects out a short distance. The lower surface of the guide has a shallow groove 470 which is just wide enough to receive the upper portions of the belt links, the sides of the groove being flared at the entering end to act as a camming chute.

The projectile ends of the rounds are guided into the receiver by a ramp 472 Figure 35 which is a substantial piece secured against the side of the receiver with a thinner portion 474 extending into the receiver with a curved upper surface to guide the projectiles. A corresponding ramp 476 is secured on the opposite side of the gun for use when the feed is desired in the other direction.

When the rounds enter the receiver the cases are guided by a ramp spring 478 which is a thin sheet of spring steel secured on the outside of the receiver with a portion 480 bent to enter the receiver and to serve as the guiding element. The guide portion 480 is preferably made with large cut-outs to increase its resilience, that is, to reduce its stiffness. A corresponding ramp spring 482 is mounted on the other side to guide the outgoing empty cartridge cases or to guide incoming rounds when the feed is from the left. This opposite ramp spring also serves as a stop for rounds fed in from the right and thus acts with the ramp spring 478 to align the round accurately with the firing chamber and support it before it is rammed by the bolt.

Since the guide 450 for the rounds is effective only up to the point where the rounds enter the receiver, a guide extension is preferably provided to control the rounds up to the moment when they move into alignment with the bolt and firing chamber. This could be in the form of an upturned flange on the rear edge of the entering portion 480 of the ramp spring 478, but as shown in Figures 8 and 34, a separate piece 484 of spring metal may be secured outside of the ramp spring 478 with an upturned flange 486 on the rear edge extending into the receiver and arranged in line with the guide flange 462. This flange 486 rides in the grooves of the rounds and prevents forward or rearward displacement of the rounds with respect to the gun until they are in position to be rammed. A corresponding guide 488 is mounted on the opposite side.

*Modified trigger mechanism*

A simplified form of trigger mechanism is shown in Figure 14. The sear 490 is the tip of the armature 492 of a solenoid 494 which is mounted within the receiver to the rear of the receiver key 168. The armature 492 is vertical and its tip engages the forward face of the firing pin key 148 when the armature moves to the position shown in the figure. A spring 496 in the solenoid presses the armature toward this position. The solenoid when energized serves as a trigger to elevate the armature and move the sear 490 vertically out of the path of the key 148. De-energization of the solenoid permits the spring 496 to move the sear down into the path of the key 148 and thus to prevent further firing.

I claim:

1. In a gun having a tube, a cylinder having a port opening into said tube to admit high pressure gas into said cylinder, means driven by gas pressure in said cylinder for feeding rounds successively into position for ramming, said means including a sprocket wheel to receive and advance the successive rounds, an escapement latch normally locking said wheel against movement, and means operable by blow-back impact of a cartridge case to unlock said wheel for a feeding step.

2. In an automatic gun having a firing chamber, means for releasably holding successive rounds of a link ammunition belt in a ramming position in line with said chamber, said means comprising a pair of ramp springs having free edges adapted to act as temporary supports for a round in ramming position and a sprocket wheel mounted above said ramming position and having peripheral recesses adapted to bear on top of a round supported by said edges, and means for indexing said sprocket wheel to feed rounds into and out of said ramming position.

3. In a gun having a tube, normally locked means operable by gas pressure from an intermediate point in said tube to feed successive rounds into position for ramming, and means operable by blow-back impact of cartridge cases to unlock said locked means for a feeding step.

4. In a gun having a tube, normally locked means operable by gas pressure from an intermediate point in said tube to feed successive rounds into position for ramming, a bolt reciprocable to ram each round when in position and to extract the empty case after firing, said bolt having a longitudinal groove in the top of the forward portion thereof, and means for unlocking said feeding means for a feeding step, said unlocking means including an upright lever having its lower end on said bolt and adapted to enter said groove when the bolt moves rearward whereby said lower end is struck by the empty cartridge case extracted by the bolt to rock said lever, and means movable a limited distance by said lever to unlock the feeding means and to cause the lever to stop the rearward travel of said cartridge case at the proper point for lateral discharge thereof from the gun.

WALLACE HAMILTON.

REFERENCES CITED

The following references are of record in the file of this patent:

UNITED STATES PATENTS

| Number | Name | Date |
| --- | --- | --- |
| 564,043 | Benet | July 14, 1896 |
| 645,436 | Teale | Mar. 13, 1900 |
| 1,290,854 | Sturgeon | Jan. 7, 1919 |
| 1,323,025 | Darne | Nov. 25, 1919 |
| 1,502,259 | Lucas | July 22, 1924 |
| 1,702,063 | Swebilius | Feb. 12, 1929 |
| 1,750,722 | McCann | Mar. 18, 1930 |
| 1,809,222 | Soncini | June 9, 1931 |
| 1,822,079 | Bull et al. | Sept. 8, 1931 |
| 2,093,706 | Browning | Sept. 21, 1937 |
| 2,144,241 | Eiane | Jan. 17, 1939 |
| 2,149,512 | Eiane | Mar. 7, 1939 |
| 2,202,232 | Rossmanith | May 28, 1940 |
| 2,204,289 | Williams | June 11, 1940 |
| 2,335,854 | Green | Dec. 7, 1943 |
| 2,337,150 | Burton | Dec. 21, 1943 |
| 2,339,027 | Mossberg | Jan. 11, 1944 |
| 2,353,118 | Schirokauer | July 4, 1944 |
| 2,365,459 | Dobremysl | Dec. 19, 1944 |
| 2,388,291 | Ruger | Nov. 6, 1945 |
| 2,401,860 | Corte | June 11, 1946 |
| 2,411,979 | Rataiczak | Dec. 3, 1946 |

FOREIGN PATENTS

| Number | Country | Date |
| --- | --- | --- |
| 12,206 | Great Britain | 1892 |
| 224,927 | Great Britain | May 24, 1923 |
| 190,057 | Germany | Sept. 27, 1907 |
| 193,379 | Switzerland | Jan. 17, 1938 |